United States Patent
Boland

(10) Patent No.: US 11,447,104 B2
(45) Date of Patent: Sep. 20, 2022

(54) WINDSCREEN WIPER ARM, PARTICULARLY FOR AUTOMOBILES

(71) Applicant: TRICO BELGIUM SA, Aubange (BE)

(72) Inventor: Xavier Boland, Arlon (BE)

(73) Assignee: Trico Belgium SA, Aubange (BE)

( * ) Notice: Subject to any disclaimer, the term of this patent is extended or adjusted under 35 U.S.C. 154(b) by 0 days.

(21) Appl. No.: 16/965,326

(22) PCT Filed: Jan. 29, 2018

(86) PCT No.: PCT/EP2018/000037
§ 371 (c)(1),
(2) Date: Jul. 28, 2020

(87) PCT Pub. No.: WO2019/145011
PCT Pub. Date: Aug. 1, 2019

(65) Prior Publication Data
US 2021/0114562 A1    Apr. 22, 2021

(51) Int. Cl.
*B60S 1/52* (2006.01)
*B60S 1/34* (2006.01)
*B60S 1/38* (2006.01)

(52) U.S. Cl.
CPC ............. *B60S 1/522* (2013.01); *B60S 1/3415* (2013.01); *B60S 1/3425* (2013.01); *B60S 1/3429* (2013.01); *B60S 1/3849* (2013.01)

(58) Field of Classification Search
CPC ........ B60S 1/3429; B60S 1/3415; B60S 1/52; B60S 1/522; B60S 1/524; B60S 1/3425; B60S 1/3849

(Continued)

(56) References Cited

U.S. PATENT DOCUMENTS 2,312,278 A * 2/1943 Maxzaiger ................ B60S 1/36
15/250.351
3,432,876 A * 3/1969 Edwards ................. B60S 1/522
15/250.04

(Continued)

FOREIGN PATENT DOCUMENTS

| EP | 3002166 | 4/2016 |
|---|---|---|
| EP | 3672844 | 7/2020 |
| WO | 2019037866 | 2/2019 |

*Primary Examiner* — Gary K. Graham
(74) *Attorney, Agent, or Firm* — Bryan Cave Leighton Paisner LLP

(57) ABSTRACT

A windscreen wiper arm, particularly for automobiles, that is able to oscillate upwardly and downwardly between a downward position and an upward position. The windscreen wiper arm comprises a wiper arm member having a substantially U-shaped cross-section, as well as a wiper rod. The wiper arm member at one end is adapted to be pivotally connected to a mounting head mounted on a drive shaft. The wiper arm member at another end is rigidly connected to the wiper rod. The wiper rod at one end extends inside the U-shaped cross-section of the wiper arm member, and the wiper rod at another end is rigidly connected to an adapter adapted to be connected to an elongated wiper blade to be placed in abutment with a windscreen to be wiped. The adapter, at the location of its connection to the wiper blade, has a U-shaped cross-section with a base and two spaced-apart legs. The U-shaped cross-section is mounted offset in a plane of the base relative to a longitudinal axis of the wiper rod. The windscreen wiper arm is provided with a nozzle for spraying a washing liquid onto the windscreen to be wiped. The nozzle is detachably connected to the adapter at a lateral side of the windscreen wiper arm facing towards the upward position.

12 Claims, 3 Drawing Sheets

(58) Field of Classification Search
USPC .................................................... 15/250.04
See application file for complete search history.

(56) References Cited

U.S. PATENT DOCUMENTS

| | | | | |
|---|---|---|---|---|
| 3,480,985 | A * | 12/1969 | Forster | B60S 1/345 |
| | | | | 15/250.352 |
| 7,093,317 | B1 * | 8/2006 | Zimmer | B60S 1/522 |
| | | | | 15/250.04 |
| 2015/0274127 | A1 | 10/2015 | Burkard et al. | |
| 2017/0197594 | A1 | 7/2017 | Deng et al. | |
| 2017/0232938 | A1 * | 8/2017 | Picot | B60S 1/3436 |
| | | | | 15/250.04 |

* cited by examiner

WINDSCREEN WIPER ARM, PARTICULARLY FOR AUTOMOBILES

BACKGROUND OF THE INVENTION

Gelman patent publication no. 34 33 106 (SWF Auto-Electric GmbH) discloses an oscillating windscreen wiper atm comprising an arm member pivotally connected to a mounting head by means of a pivot pin. The arm member has a substantially U-shaped cross-section near the pivot pin having two side walls. A part of the mounting head extends between the side walls and beyond the pivot pin. A spring is hooked with its first end on a pin on the mounting head. The arm member is connected to a wiper rod, where one end of the wiper rod extends inside the U-shaped cross-section of the arm member. The side walls of the arm member are locally folded around the wiper rod, while a holder is folded around the end of the wiper rod. The spring of this prior art windscreen wiper arm is hooked with its first end on the pin on the mounting head and with its second end on two eyes of the holder.

A disadvantage of the windscreen wiper arm known from the above German patent publication is that the windscreen wiper arm is often used in combination with a nozzle fixedly mounted on (or below) a bonnet of a car for spraying a washing liquid onto the car's windscreen to be wiped. In practice it has become apparent that the windscreen cannot effectively be cleaned by a combination of the known windscreen wiper arm and the nozzle, as the nozzle emits the washing fluid at a large distance relative to the windscreen, so that a relatively large amount of the washing fluid does not effectively reach a wiping pattern on the windscreen to be wiped. Further, it has become apparent that in the prior art, a large amount of liquid (consumption) is required in an attempt to clean the windscreen to be wiped. Further, if the washing fluid is spread onto the car's body instead of onto the windscreen to be wiped, it may damage or wet the car. Indeed, ethanol, methanol and other components of the washing fluid are believed to have a corrosive effect on paint, rubber, car wax and plastics, for example.

SUMMARY OF THE INVENTION

It is an object of the invention to obviate these disadvantages, in the sense that at minimum costs—without using complex machinery and additional tools—a simple windscreen wiper arm is proposed to effectively clean a windscreen to be wiped, without damaging or wetting parts of a car, where less washing liquid is required to clean the windscreen to be wiped.

The present invention relates to a windscreen wiper arm, particularly for automobiles, that is able to oscillate upwardly and downwardly between a downward position and an upward position. The windscreen wiper arm comprises a wiper arm member having a substantially U-shaped cross-section, as well as a wiper rod. The wiper arm member at one end is adapted to be pivotally connected to a mounting head mounted on a drive shaft. The wiper arm member at another end is rigidly connected to the wiper rod. The wiper rod has a first end that extends inside the U-shaped cross-section of the wiper arm member. The wiper rod has a second end that is rigidly connected to an adapter adapted to be connected to an elongated wiper blade to be placed in abutment with a windscreen to be wiped. The adapter, at the location of its connection to the wiper blade, has a U-shaped cross-section with a base and two spaced-apart legs, where the U-shaped cross-section is mounted offset in a plane of the base relative to a longitudinal axis of the wiper rod.

The present invention particularly relates to a windscreen wiper arm for an elongated wiper blade in the faun of a so-called flat blade, where an elastic elongated carrier element is provided. The flat blade includes at least one longitudinal groove, in which a longitudinal strip (also called a "flexor") of the carrier element is disposed. There is no restriction to the use of only one longitudinal strip forming the elastic carrier element that is particularly located in a central longitudinal groove of the flat blade. Instead, the carrier element may also comprise two longitudinal strips, where the strips are disposed in opposite longitudinal grooves of the flat blade. The groove(s) may be closed at one outer end. The flat blade comprises a connecting device (also referred to as a "connector") adapted to be connected to the adapter of the windscreen wiper arm. Preferably, the connector is made in one piece, also called a "one piece connector." Particularly, the flat blade comprises a spoiler at a side facing away from the windscreen to be wiped. The flat blade and the spoiler are preferably made in one piece through extrusion. Reference is made to European patent publication no. 1 403 156 of the same Applicant, which is herewith incorporated by reference.

The mounting head is usually fixed for rotation to the shaft. The shaft is rotatable alternately in a clockwise and in a counter-clockwise sense carrying the mounting head into rotation. Thus, in turn the mounting head draws the connecting device into rotation and thereby moves the flat blade. In the alternative, the mounting head is fixed for translation to a carriage, where the carriage can be translated alternately in a one linear direction and in another counter linear direction carrying the mounting head into translation. The present invention can therefore be used for circular or linear movement of the mounting head.

According to the invention, a windshield wiper arm is provided with a nozzle for spraying a washing liquid onto the windscreen to be wiped. The nozzle is detachably connected to the adapter at a side of the windscreen wiper arm in use facing towards the upward position. Particularly, the nozzle is snapped onto the adapter. By connecting the nozzle directly to the adapter and at a lateral side of the oscillating arm facing towards the upward position, the nozzle is not only fixed to the windscreen wiper arm in a reliable and controllable manner, although detachably in case of repair or replacement of the nozzle, but the nozzle is also arranged to spray washing liquid onto a windscreen to be wiped before the windscreen wiper arm in an upward movement is able to wipe the windscreen. Further, by connecting the nozzle to the adapter and at a lateral side of the oscillating arm facing towards the upward position, the nozzle is located at a very small distance relative to the windscreen to be wiped and is allowed to directly follow any oscillatory movement of the windscreen wiper arm, so that the washing fluid exiting the nozzle can be effectively sprayed thereon, with all positive consequences involved as to effective cleaning of the windscreen to be wiped and safe visibility for a driver.

The nozzle being arranged at a lateral side of the windscreen wiper arm in use facing towards the upward position is intended to be understood as meaning that, in an installed state of the nozzle, the nozzle is arranged next to the windscreen wiper arm, as viewed from a direction perpendicular to the windscreen to be wiped, such that in an upward movement of the windscreen wiper arm towards its upward position, the windscreen wiper arm is arranged to wipe the windscreen, after the nozzle has sprayed washing liquid thereon. The windscreen wiper arm is thus arranged behind the nozzle, seen in an upward movement thereof.

Preferably, the nozzle is connected to the adapter at a side of the adapter in use facing towards the mounting head.

It is noted that the present invention is not restricted to cars, but also refers to rail coaches and other (fast) vehicles.

In a preferred embodiment of the windshield wiper arm in accordance with the invention, the nozzle is provided with a joint part detachably connected to the adapter, as well as with a spraying part detachably connected to the joint part. Hence, different types of spraying parts may be connected to the joint part, depending on the type of car, for example. The joint part is preferably made in one piece of material, such as a plastic material. More preferably, the spraying part is snapped onto the joint part. Particularly, in order to improve aerodynamic properties, the height of the nozzle, i.e. joint part and spraying part, is equal to or less that the height of the adapter.

In another preferred embodiment of the windshield wiper arm according to the invention, the joint part is provided with a protrusion pivotally cooperating with a correspondingly shaped recess in a leg of the U-shaped cross-section of the adapter. Preferably, the leg is facing away from the wiper rod, where the recess is provided at a side of the leg in use facing towards the mounting head. Particularly, the protrusion and the recess allow a rotational movement of the joint part around a pivot axis defined by the protrusion and the recess between a mounting position and a working position. In the working position the joint part is preferably also snapped onto the wiper rod, so that in that case, the joint part is both connected to the adapter and the wiper rod.

In another preferred embodiment of the windshield wiper arm in accordance with the invention, a washing liquid tube is snapped onto the joint part. Particularly, the washing liquid tube is snapped onto the joint part at the location of the interconnection of the joint part and the wiper rod. Hence, this allows the use of a connecting part both snapping the joint part onto the wiper rod on the one hand and the washing liquid tube onto the joint part on the other hand. More in particular, the joint part comprises two C-shaped clamps interconnected back to back (forming one connecting part), one C-shaped clamp is snapped onto the wiper rod and the other C-shaped clamp is snapped onto the washing liquid tube.

In another preferred embodiment of the windshield wiper arm according to the invention, the joint part has a resilient tab opposite the protrusion, where the resilient tab snaps behind a transverse wall of the adapter. Preferably, the adapter and the wiper rod are interconnected by folding walls of the adapter around the wiper rod, where one of the folded around walls forms the transverse wall.

In another preferred embodiment of the windshield wiper arm in accordance with the invention, the joint part has a transverse groove, where a wall of the adapter rests inside the groove.

In another preferred embodiment of the windshield wiper arm according to the invention, the spraying part partly abuts a leg of the U-shaped cross-section facing away from the wiper rod.

The present invention also relates to a nozzle for spraying a washing liquid onto a windscreen to be wiped. The nozzle is provided with a joint part adapted to be detachably connected to an adapter of a windscreen wiper arm, as well as with a spraying part adapted to be detachably connected to the joint part. The joint part comprises a protrusion adapted to pivotally cooperate with a correspondingly shaped recess in a leg of a U-shaped cross-section of the adapter; a resilient tab opposite the protrusion, wherein the resilient tab is adapted to snap behind a transverse wall of the adapter; and a transverse groove adapted to receive a wall of the adapter.

BRIEF DESCRIPTION OF THE DRAWINGS

The invention will now be explained in more detail with reference to figures illustrated in a drawing, wherein.

DETAILED DESCRIPTION OF PREFERRED EMBODIMENTS

Figure 1:
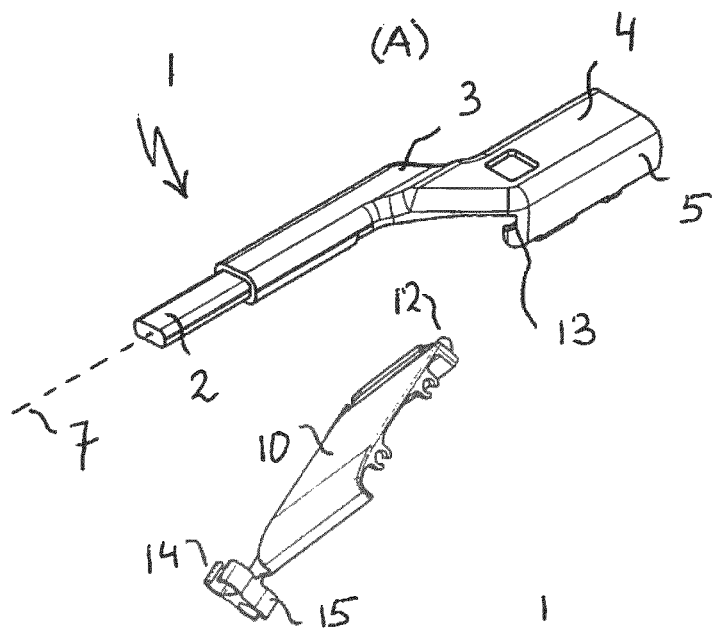
FIG. 1A shows a schematic, top perspective view of a part of a windscreen wiper atm and a joint part of a nozzle according to the invention.
FIG. 1B shows a schematic, top perspective view of the part of the windscreen wiper arm pivotally cooperating with the joint part of the nozzle of FIG. 1A.
FIG. 1C shows a schematic, bottom perspective view of the part of the windscreen wiper arm pivotally cooperating with the joint part of the nozzle of FIG. 1A.
Figure 1:
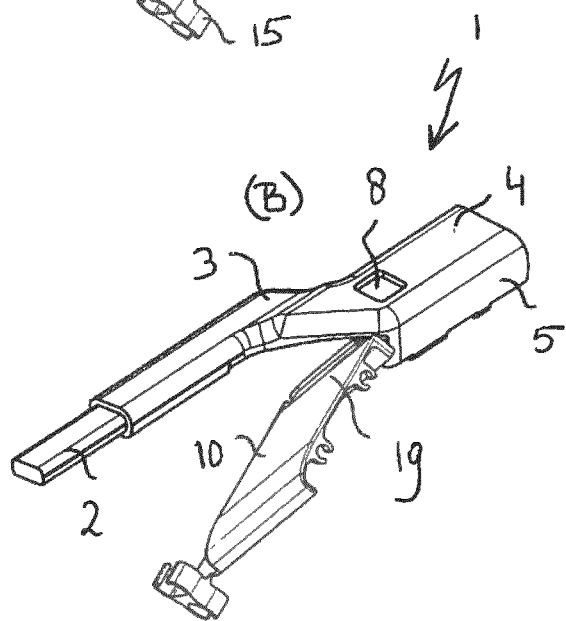
Figure 1:
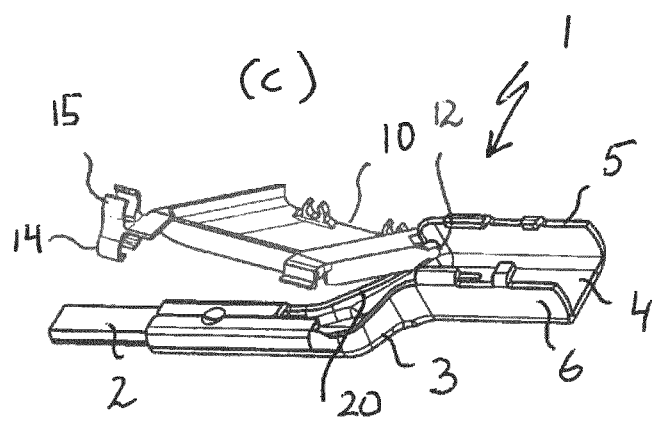
Figure 2:
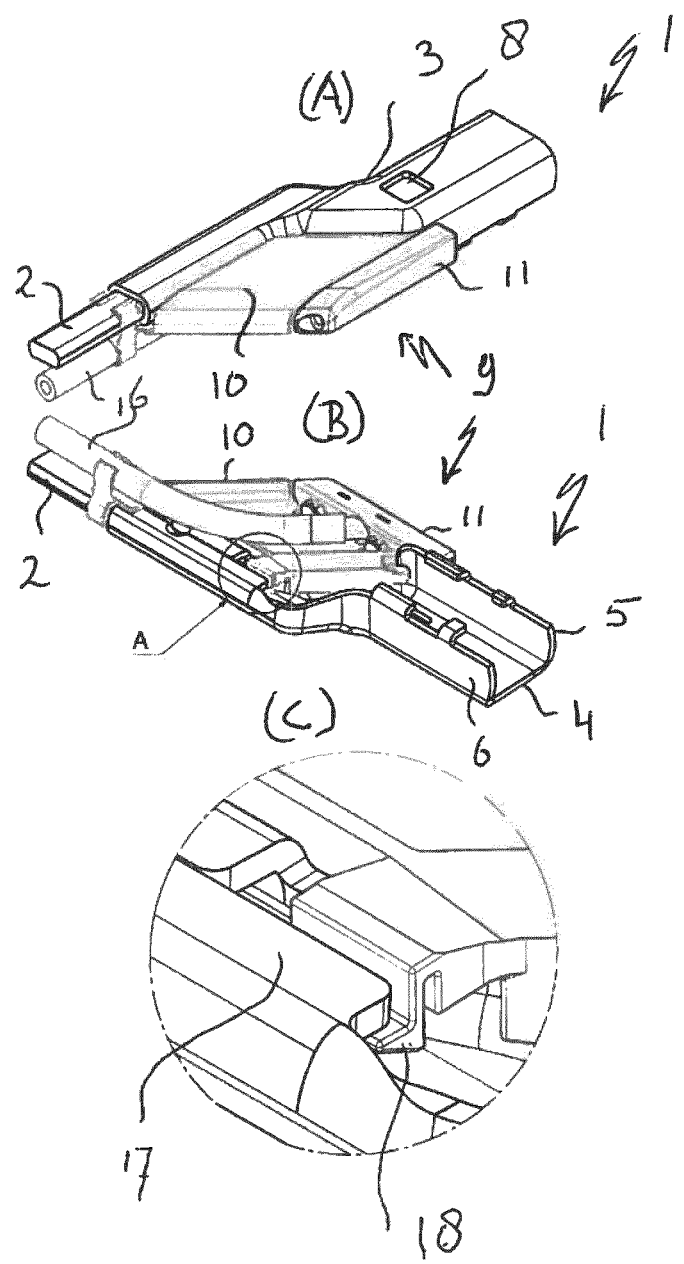
FIG. 2A shows a schematic, top perspective view of the part of the windscreen wiper arm assembled with the nozzle of FIGS. 1A-C.
FIG. 2B shows a schematic, bottom perspective view of the part of the windscreen wiper arm and the nozzle of FIG. 2A.
FIG. 2C shows an enlarged schematic, bottom perspective view of portion "A" from FIG. 2B of the part of the windscreen wiper arm and the nozzle.

FIGS. 1 and 2 show a windscreen wiper arm 1, particularly for automobiles, being able to oscillate to-and-from between reversal positions, i.e. between a downward position and an upward position over a windscreen to be wiped (not shown). The windscreen wiper arm 1 includes a wiper arm member (not shown) having a substantially U-shaped cross-section, as well as a wiper rod 2. The wiper arm member at a first free end thereof is adapted to be pivotally connected to a mounting head (not shown) mounted on a drive shaft (not shown). The drive shaft is rotatable by a small motor alternately in a clockwise and in a counterclockwise sense carrying the mounting head into rotation. Thus, in turn the mounting head draws the windscreen wiper arm 1 into rotation and thereby moves a flat blade (not shown) connected thereto. The wiper arm member at second free end thereof (opposite to its first free end) is rigidly connected to the wiper rod 2. The wiper arm member is made integrally from a single sheet material, for example a metal, where parts of the sheet material are folded outwardly to form legs of the U-shaped cross-section of the wiper arm member, and where the legs of the U-shaped cross-section of the wiper arm member are locally folded around the wiper rod 2 to form their rigid interconnection. The wiper rod 2 at a first free end thereof extends inside the U-shaped cross-section of the wiper arm member. The wiper rod 2 at a second free end thereof (opposite to its first free end) is rigidly connected to an adapter 3 adapted to be connected to an elongated wiper blade to be placed in abutment with a windscreen to be wiped. As shown, the adapter 3, at the location of its connection to the wiper blade, has a U-shaped cross-section with a base 4 and two spaced-apart legs 5,6, where the U-shaped cross-section is mounted offset in a plane of the base 4 relative to a longitudinal axis 7 of the wiper rod 2.

The windscreen wiper arm 1 with the adapter 3 is connected to a unit including a connector and a wiper blade through a so-called bayonet connection as follows. The connector comprises a resilient tongue extending outwardly and engaging in an identically shaped hole 8 provided in the base 4 of the U-shaped cross-section of the adapter 3. The connector with the wiper blade is mounted onto the adapter 3 as follows. First, the connector is easily slid on a free end of the adapter 3. During this sliding movement the resilient tongue is initially pushed in against a spring force and then allowed to spring back into the hole 8 in the adapter 3, thus snapping, that is clipping, the resilient tongue into the hole 8 of the adapter 3. By subsequently pushing in again the resilient tongue against the spring force (as if it were a push button), the connector together with the wiper blade may be released from the adapter 3. Dismounting the connector with the wiper blade from the adapter 3 is thus realized by sliding the connector together with the wiper blade in a direction away from the adapter 3. Reference is made to European patent publication no. 1 403 156 of the same Applicant, which is herewith incorporated by reference.

With reference to FIGS. 1 and 2, the windscreen wiper arm 1 is provided with a nozzle 9 for spraying a washing liquid onto the windscreen to be wiped. The nozzle 9 is detachably connected to, and preferably snapped or clicked onto, the adapter 3 at a lateral side of the windscreen wiper arm 1 in use facing towards an upward position during its oscillatory movement along the windscreen to be wiped. In other words, the longitudinal axis 7 of the wiper rod 2 and the main direction of extend of the nozzle 9 are parallel, such that in use the wiper rod 2 is always behind the nozzle 9 during an upward movement of the wiper rod 2 towards its upward position during its oscillatory motion. As shown, the nozzle 9 is arranged at a side of the adapter 3 in use facing towards the mounting head. The nozzle 9 is provided with a joint part 10 snapped onto the adapter 3, as well as with a spraying part 11 snapped onto the joint part 10. As shown in FIGS. 2A and 2B, the spraying part 11 partly abuts a leg 5 of the U-shaped cross-section of the adapter 3, that faces away from the wiper rod 2. Both parts 10,11 are each made in one piece of plastic material.

As depicted in FIG. 1C, the joint part 10 is provided with a protrusion 12 pivotally cooperating with a correspondingly shaped recess 13 in a leg 5 of the U-shaped cross-section of the adapter 3. By rotating the protrusion 12 inside the recess 13, the joint part 10 can be snapped onto the wiper rod 2. Use is made of two C-shaped clamps interconnected back to back and integral with the joint part 10, where one C-shaped clamp 14 is snapped onto the wiper rod 2 and the other C-shaped clamp 15 is snapped onto a washing liquid tube 16 for guiding washing liquid to the spraying part 11. Reference is made to FIGS. 2A and 2B.

With reference to FIGS. 1 and 2, the adapter 3 and the wiper rod 2 are interconnected by folding walls of the adapter 3 around the wiper rod 2. One of the folded around walls forms a transverse wall 17, behind which a resilient tab 18 of the joint part 10 snaps after completing the rotational movement of the joint part 10 around a hinge axis defined by the protrusion 12 and the recess 13. Reference is made to FIG. 2C.

Figure 3:
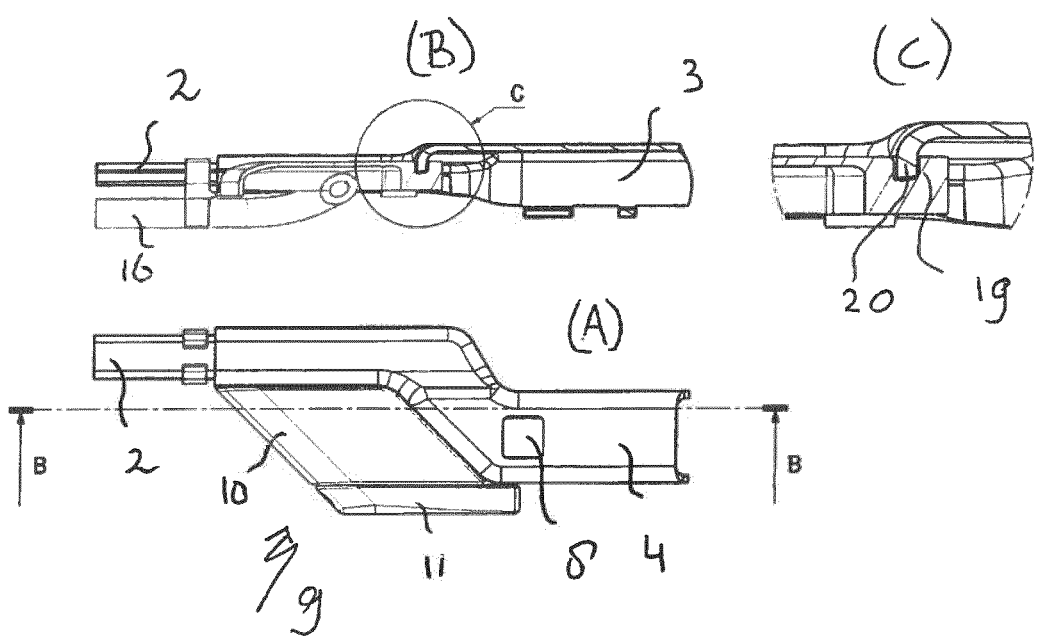
FIG. 3A shows a top view of the part of the windscreen wiper arm with the nozzle of FIG. 2A.
FIG. 3B shows a cross-sectional view of the part of the windscreen wiper arm with the nozzle along lines B-B in FIG. 3A.
FIG. 3C shows an enlarged cross-sectional view of portion "C" from FIG. 3B of the part of the windscreen wiper arm with the nozzle.

Referring to FIGS. 3A and 3B, the joint part 10 has a transverse groove 19. A wall 20 of the adapter 3 rests inside the groove 19 after completing the rotational movement of the joint part 10 around a hinge axis defined by the protrusion 12 and the recess 13. Reference is also made to FIGS. 1B and 1C showing the groove 19 in the joint part 10 and the wall 20 of the adapter 3.

The present invention is not restricted to the embodiment shown in the figures, but extends also to other preferred variants falling within the scope of the appended claims. For example, a skilled person would immediately realize that the joint part can be connected to the adapter and the wiper rod in many ways.

The invention claimed is:

1. A windscreen wiper arm adapted to be pivotally connected to a mounting head mounted on a drive shaft, wherein the windscreen wiper arm comprises:
   a wiper rod;
   an adapter adapted to be connected to an elongated wiper blade to be placed in abutment with a windscreen to be wiped, wherein one end of said wiper rod is rigidly connected to said adapter, wherein said adapter, at a location of its connection to the wiper blade, has an adapter U-shaped cross-section with a base and two spaced-apart legs, and wherein said adapter U-shaped cross-section is mounted offset in a plane of said base relative to a longitudinal axis of said wiper rod;
   a nozzle for spraying a washing liquid onto the windscreen to be wiped, wherein said nozzle is detachably connected to said adapter at a lateral side of the windscreen wiper arm in use facing towards an upward position, wherein the nozzle comprises a joint part detachably connected to said adapter and a spraying part detachably connected to said joint part, wherein said nozzle is detachably connected to said adapter at an end side of said adapter in use facing towards said mounting head; and
   a washing liquid tube snapped onto said joint part, wherein said washing liquid tube is snapped onto said joint part at an interconnection of said joint part and said wiper rod.

2. The windscreen wiper arm according to claim 1, wherein said nozzle is snapped onto said adapter.

3. The windscreen wiper arm according to claim 1, wherein said joint part includes a protrusion pivotally cooperating with a correspondingly shaped recess in one leg of said adapter U-shaped cross-section.

4. The windscreen wiper arm according to claim 3, wherein said one leg is facing away from said wiper rod, and wherein said recess is provided at a side of said one leg in use facing towards the mounting head.

5. The windscreen wiper arm according to claim 3, wherein said protrusion and said recess allow a rotational movement of said joint part around a pivot axis defined by said protrusion and said recess between a mounting position and a working position.

6. The windscreen wiper arm according to claim 5, wherein in said working position said joint part is snapped onto said wiper rod.

7. The windscreen wiper arm according to claim 3, wherein said joint part includes a resilient tab opposite said protrusion, and wherein said resilient tab snaps behind a transverse wall of said adapter.

8. The windscreen wiper arm according to claim 7, wherein said adapter and said wiper rod are interconnected by folding walls of said adapter around said wiper rod, and wherein one of said folded around walls forms said transverse wall.

9. The windscreen wiper arm according to claim 1, wherein said joint part includes a transverse groove, and wherein a wall of said adapter rests inside said groove.

10. The windscreen wiper arm according to claim 1, wherein said spraying part is snapped onto said joint part.

11. The windscreen wiper arm according to claim 10, wherein said spraying part abuts one leg of said adapter U-shaped cross-section facing away from said wiper rod.

12. A windscreen wiper arm, wherein one end of the wiper arm member is adapted to be pivotally connected to a mounting head mounted on a drive shaft, wherein the windscreen wiper arm comprises:
   a wiper rod;
   an adapter adapted to be connected to an elongated wiper blade to be placed in abutment with a windscreen to be wiped, wherein one end of said wiper rod is rigidly connected to said adapter, wherein said adapter, at a location of its connection to the wiper blade, has an adapter U-shaped cross-section with a base and two spaced-apart legs, and wherein said adapter U-shaped cross-section is mounted offset in a plane of said base relative to a longitudinal axis of said wiper rod; and
   a nozzle for spraying a washing liquid onto the windscreen to be wiped, wherein said nozzle is detachably connected to said adapter at a lateral side of the windscreen wiper arm in use facing towards an upward position, wherein the nozzle comprises a joint part detachably connected to said adapter and a spraying part detachably connected to said joint part, wherein said joint part includes a protrusion pivotally cooperating with a correspondingly shaped recess in one leg of said adapter U-shaped cross-section, wherein said protrusion and said recess allow a rotational movement of said joint part around a pivot axis defined by said protrusion and said recess between a mounting position and a working position, wherein in said working position said joint part is snapped onto said wiper rod.

* * * * *